US009336637B2

(12) United States Patent
Neil et al.

(10) Patent No.: US 9,336,637 B2
(45) **Date of Patent: *May 10, 2016**

(54) WIRELESS ACCESS CONTROL SYSTEM AND RELATED METHODS

(75) Inventors: James W. Neil, Melbourne, FL (US); Philip C. Dumas, Orlando, FL (US)

(73) Assignee: UNIKEY TECHNOLOGIES INC., Orlando, FL (US)

( * ) Notice: Subject to any disclaimer, the term of this patent is extended or adjusted under 35 U.S.C. 154(b) by 1012 days.

This patent is subject to a terminal disclaimer.

(21) Appl. No.: 13/415,365

(22) Filed: Mar. 8, 2012

(65) Prior Publication Data

US 2012/0234058 A1 Sep. 20, 2012

Related U.S. Application Data

(60) Provisional application No. 61/453,737, filed on Mar. 17, 2011.

(51) Int. Cl.
*G05B 19/00* (2006.01)
*G07C 9/00* (2006.01)

(52) U.S. Cl.
CPC .. *G07C 9/00571* (2013.01); *G07C 2009/00793* (2013.01); *G07C 2209/04* (2013.01); *Y10T 70/5155* (2015.04)

(58) Field of Classification Search
CPC ................. G07C 9/00103; G07C 2009/00634; G07C 9/00309; G07C 2209/62; G07C 9/00571; G07C 9/00174; G07C 9/00658; G07C 9/00896; H04W 28/18; H04W 48/08; H04W 12/08; H04W 88/08; H04W 92/12; E05B 19/0005; E05B 2047/0095
See application file for complete search history.

(56) References Cited

U.S. PATENT DOCUMENTS

| | | | | |
|---|---|---|---|---|
| 6,072,402 | A | 6/2000 | Kniffin et al. | |
| 6,236,333 | B1 | 5/2001 | King | |
| 6,611,742 | B1 * | 8/2003 | Sand et al. | 701/36 |
| 6,621,420 | B1 * | 9/2003 | Poursartip | 340/907 |
| 7,173,516 | B2 | 2/2007 | Mullet et al. | |
| 7,701,331 | B2 | 4/2010 | Tran | |

(Continued)

FOREIGN PATENT DOCUMENTS

| | | |
|---|---|---|
| CN | 101532353 | 9/2009 |
| JP | 2000145222 | 5/2000 |

(Continued)

OTHER PUBLICATIONS

International Search Report of corresponding PCT/US2013/059699.

(Continued)

*Primary Examiner* — Kerri McNally
*Assistant Examiner* — Renee Dorsey
(74) *Attorney, Agent, or Firm* — Allen, Dyer, Doppelt, Milbrath & Gilchrist, P.A.

(57) ABSTRACT

A wireless access control system includes a remote access device. A plugin device communicates with the remote access device. A lock controls the ability to lock and unlock a door in which the lock is disposed. The lock is in communication with the plugin device. The plugin device determines a distance between the remote access device and the lock and causes the lock to communicate with the remote access device when the remote access device is at a distance less than or equal to a predetermined distance from the lock to enable the lock to be unlocked.

29 Claims, 7 Drawing Sheets

(56) References Cited

U.S. PATENT DOCUMENTS

| | | | | |
|---|---|---|---|---|
| 8,373,555 | B1* | 2/2013 | Redden et al. | 340/539.1 |
| 2002/0013909 | A1 | 1/2002 | Baumeister et al. | |
| 2003/0222758 | A1 | 12/2003 | Willats et al. | |
| 2005/0010780 | A1* | 1/2005 | Kane et al. | 713/182 |
| 2006/0164208 | A1* | 7/2006 | Schaffzin et al. | 340/5.64 |
| 2006/0247847 | A1* | 11/2006 | Carter et al. | 701/200 |
| 2008/0018437 | A1 | 1/2008 | Reichling et al. | |
| 2008/0117176 | A1 | 5/2008 | Ko et al. | |
| 2008/0231433 | A1 | 9/2008 | McBride et al. | |
| 2008/0238610 | A1 | 10/2008 | Rosenberg | |
| 2009/0002153 | A1 | 1/2009 | Berstis et al. | |
| 2009/0066476 | A1 | 3/2009 | Raheman | |
| 2010/0052931 | A1 | 3/2010 | Kolpasky et al. | |
| 2010/0059231 | A1 | 3/2010 | Thomas et al. | |
| 2010/0164683 | A1 | 7/2010 | Sharma et al. | |
| 2010/0201536 | A1 | 8/2010 | Robertson et al. | |
| 2010/0245038 | A1 | 9/2010 | Ghabra et al. | |
| 2010/0306549 | A1 | 12/2010 | Ullmann | |
| 2011/0092185 | A1* | 4/2011 | Garskof | 455/411 |
| 2011/0223868 | A1* | 9/2011 | Kojima et al. | 455/67.11 |
| 2012/0234058 | A1 | 9/2012 | Neil et al. | |
| 2012/0258681 | A1 | 10/2012 | Hanover | |
| 2012/0280783 | A1 | 11/2012 | Gerhardt et al. | |
| 2013/0176107 | A1 | 7/2013 | Dumas et al. | |
| 2013/0237193 | A1 | 9/2013 | Dumas et al. | |
| 2013/0241694 | A1 | 9/2013 | Sharma et al. | |
| 2014/0077929 | A1 | 3/2014 | Dumas et al. | |
| 2014/0292481 | A1 | 10/2014 | Dumas et al. | |

FOREIGN PATENT DOCUMENTS

| | | | |
|---|---|---|---|
| JP | 2003262072 | | 9/2003 |
| KR | 1020030083538 | | 10/2003 |
| KR | 20040093937 | A | 11/2004 |
| KR | 20050005786 | A | 1/2005 |
| KR | 1020080086623 | | 9/2008 |
| KR | 2020100001206 | | 2/2010 |
| WO | 2011159921 | | 12/2011 |
| WO | WO-2012/0134263 | | 5/2012 |

OTHER PUBLICATIONS

Written Opinion and International Search Report of PCT/US2013/059695.

Dumas et al., U.S. Appl. No. 14/681,243, filed Apr. 8, 2015.

Dumas et al., U.S. Appl. No. 14/681,263, filed Apr. 8, 2015.

Dumas et al., U.S. Appl. No. 14/681,281, filed Apr. 8, 2015.

* cited by examiner

WIRELESS ACCESS CONTROL SYSTEM AND RELATED METHODS

CROSS REFERENCE TO RELATED APPLICATION(S)

This application claims the benefit of Provisional Patent Application No. 61/453,737, filed Mar. 17, 2011, in its entirety and is hereby incorporated by reference.

FIELD OF THE INVENTION

The present invention generally relates to access control systems, and more particularly, to wireless access control systems.

BACKGROUND

A passive keyless entry (PKE) system, offers an increased level of convenience over a standard lock and key, for example, by providing the ability to access a secure building or device without having to find, insert, and turn a traditional key. A user may simply approach a locked PKE lock and with little if any pause, the lock grants this user access if they are carrying an authorized token.

A PKE system is currently used in an automotive application and may offer increased convenience by identifying drivers and unlocking the car as they approach. Automotive access is traditionally given by inserting a key into the lock or by pushing buttons on a traditional remote keyless entry (RKE) system. In contrast, a PKE system grants access with reduced user interaction through the use of a token carried by the driver.

Several technical challenges have been encountered during the engineering of a radio frequency (RF) PKE system, for example, for use in a residential lock. The desired basic perceived behavior of the PKE system in a residential application may be as follows: 1) the user approaches and touches the lock; 2) the lock authenticates the user with a minimally perceived delay; 3) the lock unlocks; 4) the lock may not operate if the authorized user is outside a desired range and the lock is touched by another, unauthorized, user; 5) the lock may not operate if the authorized user is on the inside of the house, and the lock is touched on the outside by an unauthorized user; and 6) the battery powered lock needs months worth of battery life to prevent inconvenient and costly battery changes. 7) when an authorized user revokes a key from another user, it may be revoked within a timely manner.

Indeed, as will be appreciated by those skilled in the art, with respect to the above desired basic perceived behavior of the PKE system in a residential application, primary challenges to be addressed include items 2 (speed), 4 (distance), 5 (location), 6 (battery life), and 7 (timely revocation). Accordingly, it may be desirable to improve authentication speed, proximity measurement, location determination, decrease power consumption, and timely revocation processes for example.

SUMMARY OF THE INVENTION

A wireless access control system includes a remote access device for accessing a lock. A plugin device communicates with the remote access device. The lock contains a controller for controlling the ability to lock and unlock a door in which the lock is disposed. The lock is in communication with the plugin device. The plugin device determines a distance between the remote access device and the lock, and causes the lock to communicate with the remote access device when the remote access device is at a distance less than or equal to a predetermined distance from the lock. At a distance less than or equal to the previous predetermined distance, the system enables the lock to be unlocked by the remote access device.

In one embodiment, the plugin device determines whether the remote access device is authorized to unlock the lock. In another embodiment, the lock also communicates with the remote access device, and acting in conjunction with the plugin device, determines the distance of the remote access device from the lock. The lock may also experience a sleep mode, the plugin device waking the lock when the plugin device determines that the remote access device is less than or equal to a predetermined distance from the lock.

DETAILED DESCRIPTION OF THE INVENTION

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Figure 1:
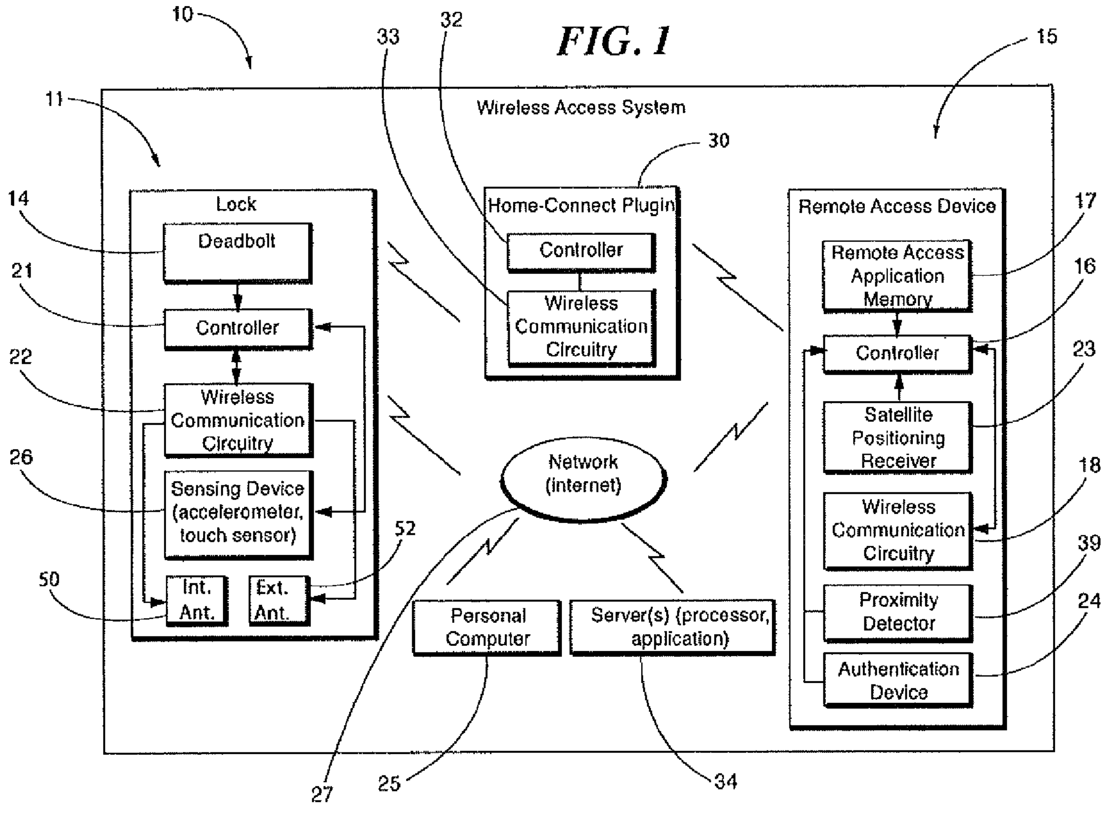
FIG. 1 is a schematic diagram of a wireless access system according to the present invention.
Figure 2A:
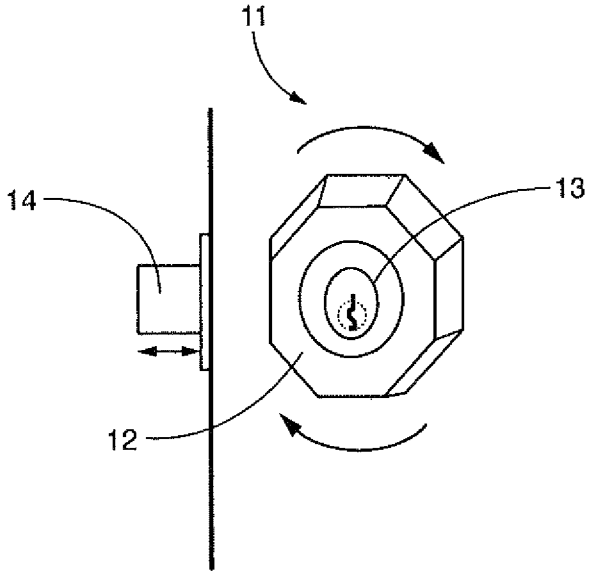
FIG. 2*a* is a perspective view of a lock constructed in accordance with the invention.
Figure 2B:
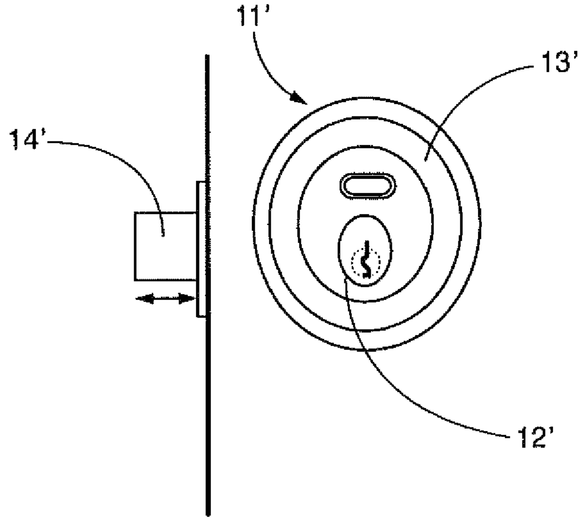
FIG. 2*b* is a perspective view of a lock constructed in accordance with another embodiment of the invention.

Referring to FIGS. 1, 2*a*, and 2*b*, a wireless access system 10, for example, a PKE system, includes a lock 11. The lock 11 may be installed in a standard deadbolt hole and may be battery powered, for example. The lock 11 may be a human controlled (keyed) lock, for example (FIG. 2*a*). The lock 11 includes an outer cylinder 12 that rotates freely around a standard key cylinder 13. When engaged, the cylinder 13 is linked to a deadbolt 14, thus giving the user control to extend or retract the deadbolt utilizing their key. The lock 11 includes a controller 21 or processor and wireless communication circuitry 22 for wireless communication which as will be discussed below, enable remote access device 15 to operate lock 11.

Alternatively, in another embodiment, the lock 11' may be motor powered (FIG. 2*b*). When a user is in sufficiently close vicinity or touches anywhere on the lock 11', the deadbolt 14' is driven by the motor (not shown) to open the lock for authorized users having the remote access device 15. Of course, the lock 11 may be another type of lock or locking mechanism and may be installed in any access point, for example.

Figure 3A:
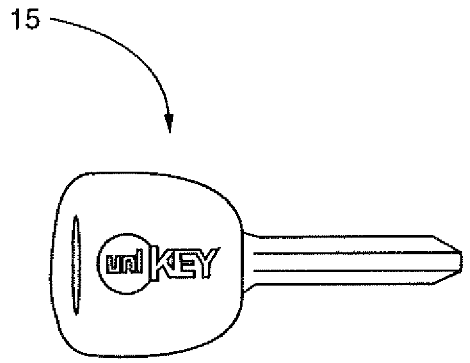
FIG. 3*a* is a top plan view of a remote access device constructed in accordance with the invention as a key.

Referring now additionally to FIG. 3, the wireless access system 10 includes a remote access device 15. The remote access device 15 is advantageously a key or token configured to control the lock 11. In particular, the remote access device 15 may be a standard key including a remote controller 16 for controlling lock 11 and remote wireless access electronics coupled thereto (FIG. 3*a*). Remote access device 15 also includes wireless communication circuitry 18 for sending and receiving signals. In a preferred non-limiting example, the signal is a Bluetooth signal.

Figure 3B:
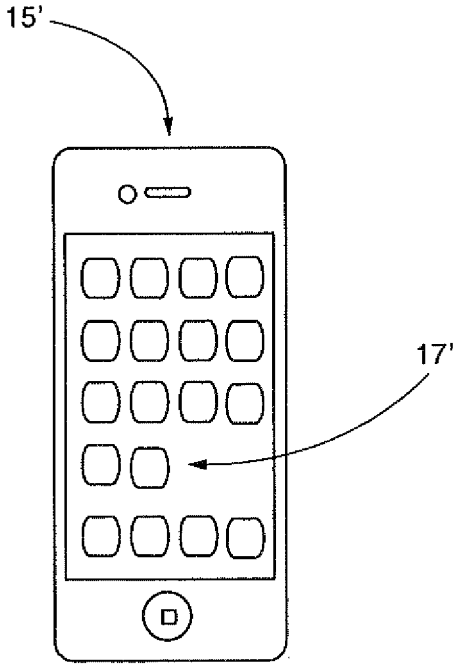
FIG. 3*b* is a front plan view of a remote access device constructed in accordance with yet another embodiment of the invention as an application for a cell phone.

Alternatively, or additionally, the remote access device 15 may be a mobile wireless communications device, such as, for example, a mobile telephone that may include the remote wireless access electronics described above cooperating with an application 17' stored in memory 17 (FIG. 3*b*). The application 17' may be configured to send a signal to provide access and control over the lock 11', for example. Of course, more than one remote access device 15' may be used and may be another type of remote access wireless device, for example, a wireless FOB without the mechanical key, as will be appreciated by those skilled in the art.

Figure 4:
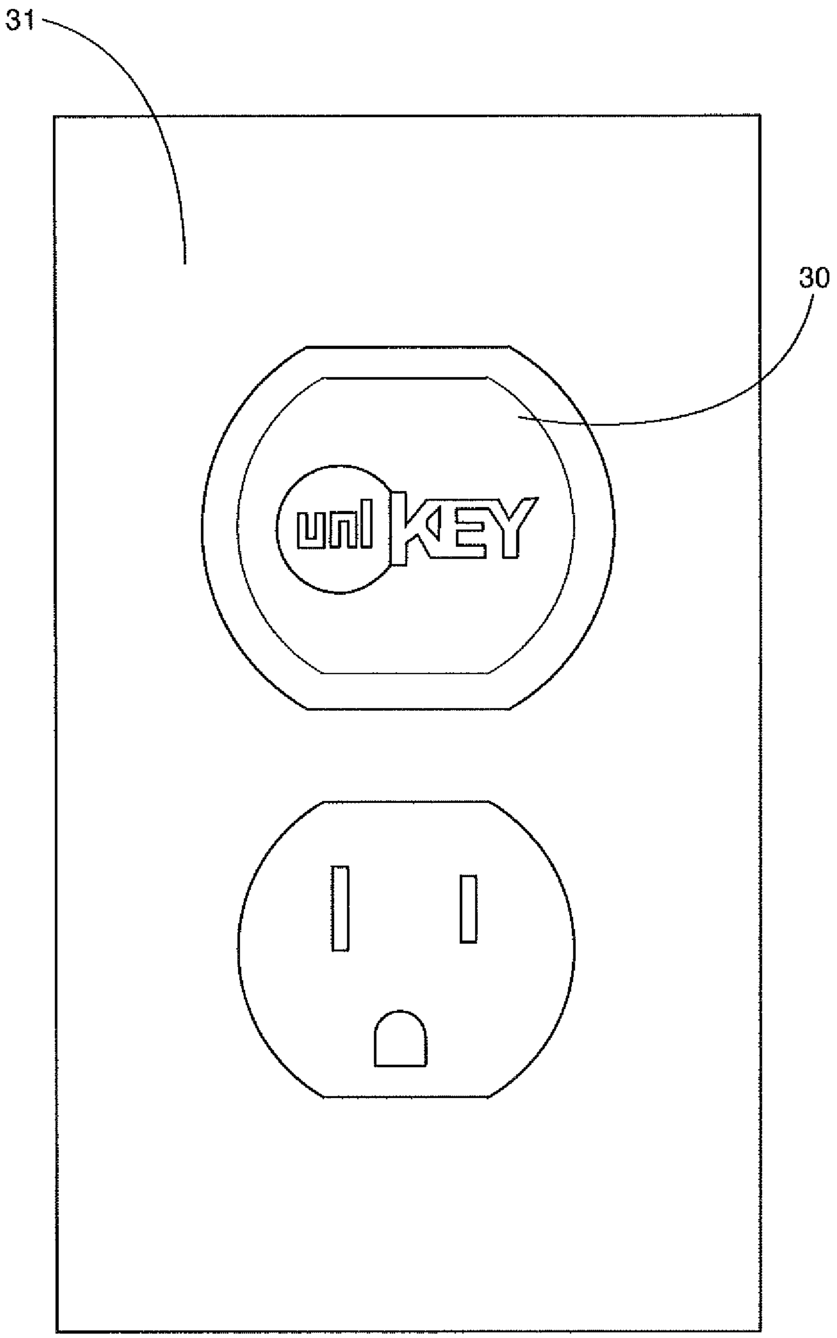
FIG. 4 is a front plan view of a home-connect plugin of the wireless access system constructed in accordance with the invention.

Referring now additionally to FIG. 4, the wireless access system 10 also includes a home-connect plugin 30. A typical mains power outlet 31 is shown, with the home-connect plugin 30 plugged-into it. The home-connect plugin 30 includes a home-connect controller 32 and associated wireless communication circuitry 33 cooperating therewith and configured to communicate with the lock 11, and the remote access device 15.

The home-connect plugin 30 may also be part of a wireless local area network (WEAN) connectivity, for example, Wi-Fi connectivity, to link it to an off-site web-based server 34, for example. This advantageously enables the lock 11 to receive near real time updates for adding or removing users, one-time access, extended access or specific timed access, and other connectivity related updates and functions, as will be appreciated by those skilled in the art. Additional services may be selectively provided via the Internet using the WLAN connectivity provided by server 34, for example. While the home-connect plugin 30 is described herein as a plugin device, it will be appreciated by those skilled in the art that the functionality of the home-connect plugin 30 may be embodied in any of a number of form factors, for example.

Figure 5:
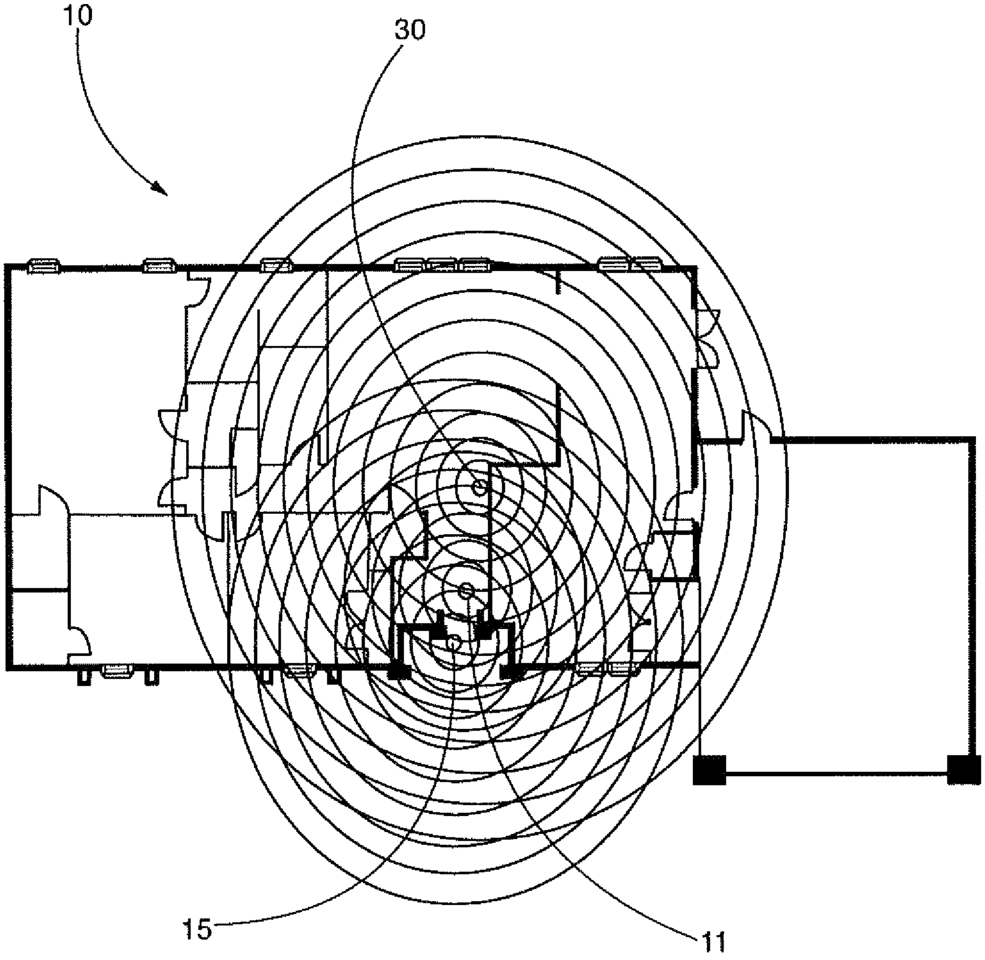
FIG. 5 is a schematic diagram of the communication between the components of the wireless access system in a typical residential system layout in accordance with the invention.

Referring now additionally to FIG. 5, a typical residential setup example of the wireless access system 10 is illustrated. As described above with respect to FIG. 4, the home connect plugin 30 is typically plugged-in to the mains power outlet 31, at a location in relatively close proximity, sufficient to communicate therewith, to the lock 11, which may be installed on the front door, for example. The remote access device 15 approaches from the outside of the home. Both the home-connect plugin 30 and lock 11 are configured to communicate with the remote access device 15 independently or simultaneously, as will be described below and appreciated by those skilled in the art.

The home-connect plugin 30 may be configured to approximately determine the position of the remote access device 15. In a preferred non-limiting embodiment, the home connect plugin 30 periodically sends a signal to communicate with a remote access device 15. When remote access device 15 is within range to receive the signal, remote access device 15 outputs a return signal to home-connect plugin 30. Lock 11 may also receive, the signal from remote access device 15. By determining a received signal strength indication (RSSI). For example, when an algorithm of the home-connect plugin 30 determines that the remote access device 15 is approaching and is within a defined range.

In one non-limiting exemplary embodiment, lock 11 is in a hibernation or low power level state. Upon determining that the remote access device is within a predetermined distance, the home-connect plugin 30 may send a wakeup signal to the lock 11. In this way, home-connect plugin 30 may be configured to have an extended range capability, for example, 100 or more meters. The lock 11 has a smaller range, for example, of about 10 meters, but may be greater in some cases. Therefore, the home-connect plugin 30 may communicate with the remote access device 15 before the lock 11. Thus, the home-connect plugin 30 may send a signal to the lock 11 to wake up and start communicating with the remote access device 15 to save battery life, for example. By causing remote access device 15 and lock 11 to communicate only in response to a signal from home-connect plugin 30, the battery life of lock 11 and remote access device can be extended.

Figure 6:
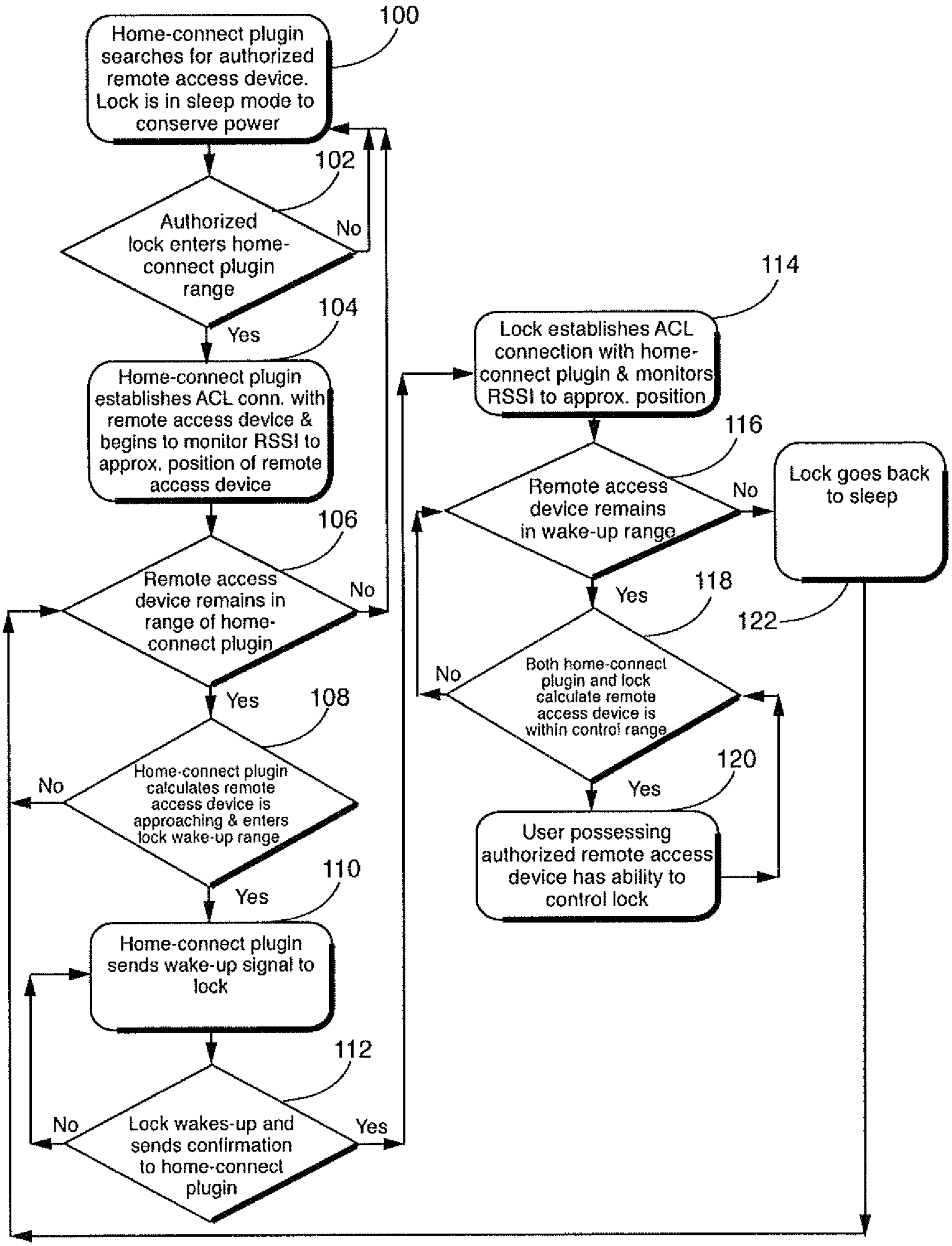
FIG. 6 is a flow chart of operation of the wireless access system in accordance with the invention.

Additionally, the home-connect plugin 30 may establish a communication link with the remote access device 15 in advance, for example, thus increasing the speed of the authentication process to create little if any perceived delay for the user. Once the lock 11 is woken up by the home-connect plugin 30 and connected to the remote access device 15, both the home-connect plugin and the lock track the RSSI of the remote access device until the algorithm determines it is within a defined accessible range from lock 11. Both the home-connect plugin 30 and the lock 11 gathering RSSI data together may utilize this data in an algorithm to determine the position of the remote access device 15 with greater accuracy than either the home-connect plugin 30 or lock 11 alone. Once the remote access device 15 is within the determined accessible distance, the home-connect plugin 30 grants remote access device 15 access control to the lock 11. More than one home-connect plugin 30 may be used in some embodiments for more accurate position determining, and to increase authorized user capacity and overall speed of the wireless access system 10, Operation of the wireless access system 10 will now be described with reference additionally to the flowchart in FIG. 6. The lock 11, may initially be in a sleep mode to conserve battery power, for example. The home-connect plugin 30 is typically powered on and searching for authorized remote access devices 15, i.e. token(s), the standard key, and/or the mobile wireless communications device, in range in a step 100. In one preferred non-limiting embodiment, authorization is established by syncing the Bluetooth identifier of remote access devices 15 and home-connect plugin 30 as known in the art. The home connect plugin 30 establishes an asynchronous communication link, (ACL) connection. In this way the system is self authorizing and it only recognizes components with which it has established a connection.

The authorized remote access device 15 enters the home connected plugin 30 broadcast range in a step 102. Once the home-connect plugin 30 finds an authorized remote access device 15 in range, it establishes connection in a step 104 and begins to monitor the RSSI of the return signal from remote access device 15 to estimate its position.

In a step 106, it is determined whether remote access device 15 remains in range of the home connect plugin 30 if not the process returns to step 100 to begin again. If yes, then home connect plugin 30 calculates whether remote access device 15 is approaching and whether it enters the lock wake-up range in step 108. If not, step 106 is repeated. Once the home-connect plugin 30 estimates that the remote access device 15 has entered the defined wake-up range in a step 108, it sends a wake-up and connection signal to the lock 11 in a step 110.

In a step 112 it is determined whether lock 11 wakes up and sends confirmation to home connect plugin 30. If not, the wake-up signal is repeated in step 110. Once the lock 11 wakes up, it also establishes a low level connection with the remote access device 15 in a step 114, and begins to monitor the RSSI of the remote access device 15 or devices if there are more than one. Both the home-connect plugin 30 and the lock 11 are monitoring RSSI to more accurately determine the position of the remote access device 15 in a step 118. This computing may be performed by a processor or controller 32 included within the home-connect plugin 30, the controller 21 within lock 11, or both. The home-connect plugin 30 and the lock 11 determine whether the remote access device is within the determined accessible distance in step 116. It is determined whether the home connect plugin 30 and lock 11 calculate the remote access device 15 is within the control range. If not, the determination is again made in step 116; if yes, then the user is granted authorization to the lock 11, and the deadbolt 14 becomes controllable in a step 120, either extending or retracting per the user's action.

If the remote access device 15 is not within the wake-up range of lock 11, then lock 11 goes back to sleep or a low power mode, in a step 122.

Additional and/or alternative functions of the wireless access system 10 will now be described. For example, with respect to an independent function, plugin 30 continuously pings lock 10 at a low energy level. If the home-connect plugin 30 loses power or goes offline, the lock 11 may be configured to have a change of status to wake up in the absence of the signals from plugin device 30, or to be woken up by a user's touch and approximately determine the position of the user by itself, as well as authenticate the user I a manner similar to that described in connection with plug in device 30. In an embodiment in which the remote access device is a smart phone, tablet, or similar device, home-connect plugin 30 may also request the user to verify their access control request by prompting them on their remote access device 15', for example, via a display on their mobile wireless communications device.

The wireless access system 10 may include a calibration feature. More particularly, a connection between the home-connect plugin 30 and the lock 11 may be used by the algorithm to calibrate the RSSI input to adjust for changes in user behavior or environmental conditions, for example. In one non limiting example, plugin device 30 determines RSSI values for remote access device 15 over a number of distinct communications. It then determines a maximum average in range value in which communication between plugin device 30 and remote access device 15 occurs and a minimum average in range value at value in which communication between plugin device 30 and remote access device 15 occurs. In this way, the distances at which plugin 30 begins communicating with remote access device 15 self adjusts as a function of user behavioral changes or local conditions.

In a process to revoke a key where the key is a smart phone, tablet or the like, once a user decides to revoke a key code, the user may send a termination request to home-connect plugin 30 or to the remote access device key 15' being revoked. If there is no response, the request is broadcast to users, for example, all users, in the "approved" network (i.e. users enrolled in the same lock). The request is stored in the background on their respective keys. Then when any authorized user is in range of the lock 11, the claimant request is activated and the key code of the requested revoked user is revoked from the lock, denying access to the revoked user.

The wireless access system 10 may also include a computing device 25, for example, a personal computer at the user's residence for use in the revocation process. The computing device 25 may include circuitry for wirelessly communicating with the home-connect plugin 30, remote access device 15, and/or lock 11 for revoking the permission. For example, the computing device 25 may include Bluetooth communications circuitry, for example. Other devices and communications protocols may be used in the revocation process.

While the wireless access system 10 is described herein with respect to a door, the wireless access system may be used for access control or protection of, but not limited to, appliances, a safe, heavy machinery, factory equipment, power tools, pad locks, real estate lock-boxes, garage door openers, etc., for example. Alternative remote access device 15 embodiments may include a pen, watch, jewelry, headset, FDA, laptop, etc., for example. The wireless access system 10 may be used to protect other devices or areas where it may be desired to restrict access.

Figure 7:
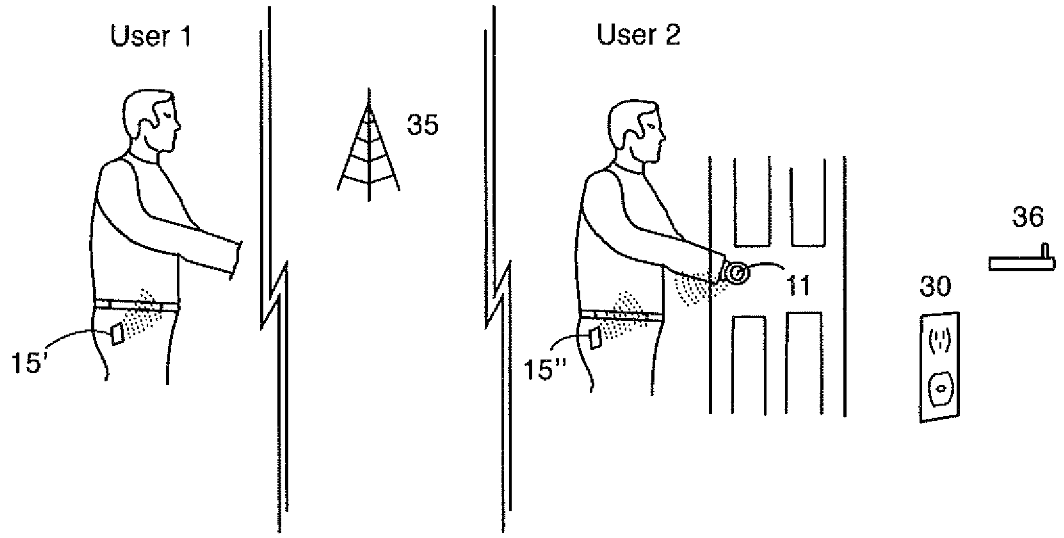
FIG. 7 is a schematic diagram of a system for changing tokens in accordance with the invention.

The present invention lends itself to a process for transferring one-time, limited time, or permanent use Passive Keyless Entry (PKE) token key codes to a cellular or other wireless mobile remote access device 15' for use with PKE access control devices. Reference is now made to FIG. 7. In one exemplary, but non limiting embodiment, a first user has a first remote access device 15' embodied in a mobile communication device that is PKE enabled and is known to plugin device 30 as an authorized user of lock 11. A second user has a second remote access device embodied in a mobile communication device 15" that is PKE enabled, but is not authorized for use with lock 11. Both users can communicate locally with lock 11 via a wireless Bluetooth network as discussed above. Furthermore, both users have the ability to communicate with each other via a cellular network 35 as known in the art, or other wireless communication and as a result have an almost unlimited range.

The authorized user of lock 11, chooses to send an unauthorized user an authorized token for the lock 11 by way of a mobile application 17 on authorized remote access device 15' to unauthorized remote access device 15". The authorized user can select the option within mobile application 17 on authorized remote access device 15' for a one-time, limited time, or permanent token to send to unauthorized remote access device 15".

In one exemplary, but non limiting embodiment, the key code is transmitted from the authorize remote access device 15' to the currently unauthorized remote access device 15" via the cellular network 35. Now unauthorized remote access device 15" becomes an authorized user of the lock 11. Another embodiment can be that authorized remote access device 15' sends a request for information to unauthorized remote access device 15" which responds to authorized remote access device with useful information such as device 15" Bluetooth address. This information is then transmitted from authorized remote access device 15' to the home connect plugin 30 via the cellular network 35 to the internet, then from the internet to a WiFi router 36 that is in range and can relay the information to the plugin 30. The plugin 30 then transfers identification information to the lock 11, so that when now authorized remote access device 15" tries to access the lock 11, it is already a known remote access device.

It should be noted that the use of the mobile phone cellular network was used by way of non limiting example. The key code can be sent directly to another device via SMS text message, Email, or other data communication protocols.

Additionally, the key codes can be sent to another device through server 34, or a server disposed in the communications network, which can also act as a master database. Additionally, the key code master database can allow a user to manage (send, receive, revoke) locks from a secured webpage. Additionally, the key code master database can be used to restore a devices key codes via a mobile application with verification upon a lost or damaged device.

With respect to power conservation and increased security methods for the remote access device 15, and more particularly, a mobile wireless communications device 15', for example, that may include the remote access application and a global positioning system (GPS) receiver 23, the GPS receiver may be used to track the location relative to the lock's position and enable communication by remote access device 15 only when within range. If the remote access device 15, i.e. mobile wireless communications device 15' is outside the range, as determined by the GPS receiver 23, it may go into sleep mode or turn off. Additionally, or alternatively, the location of the mobile wireless communication device 15' may be determined via triangulation with wireless service provider base stations or towers, for example.

Alternatively, or additionally, the remote access device 15 or mobile wireless communications device 15' may wake up, determine a position, calculate a fastest time a user could be within range of the lock 11, then wake up again at that time and recalculate. When the user is within the range, it may enable the remote access application 17, and, thus communication for authentication or other purposes.

The wireless access system 10 may be used to augment multi-factor authentication, e.g. use with a biometric identifier, personal identification number (PIN) code, key card, etc. The wireless access system 10 may also allow simultaneous multiple authentication of remote access device, for example, mobile wireless communications devices. More particularly, the wireless access system 10 may require a threshold number of authorized remote access devices 15 to be present at a same time for authentication to succeed.

The wireless access system 10 advantageously may provide increased security, for example. More particularly, the wireless access system 10 may force the user to authenticate in addition to authorization, via the remote access device 15 before the door can be opened. For example, the remote access device 15 may include an authentication device 24 for authentication via a biometric, password, PIN, shake pattern, connect-the-dots, or combination thereof, for example, prior to accessing the lock 11. In the case of the remote access application 17 on a mobile wireless communications device, for example, the application may have multiple security levels to enable these features, as will be appreciated by those skilled in the art.

With respect to security features, by using proximity sensors, switches, or the like, the wireless access system 10 may indicate whether a user locked the door, for example. When a user locks the door, for example, the remote access application 17 may log "Lock" with a time stamp so that it may be tracked and checked on the remote access device 15, i.e. the mobile wireless communications device, for example. The wireless access system 10 may include a sensing device 26 for example, an accelerometer to track door openings, for example. Based upon the accelerometer, data may be provided through the application or via the Internet or other network, for example. The sensing device 26 may be another type of device, for example, a touch sensor.

In one advantageous security feature, when the door is opened, or an attempt is made to open the door, which may be detected by the accelerometer 26 or other door opening determining methods, as will be appreciated by those skilled in the art, known, and even previously revoked, remote access devices 15 in range and/or discoverable devices, may be recorded along with a time stamp. This may capture an unauthorized user, for example.

Another advantageous feature of the wireless access system 10 may allow authorized visits, for example. More particularly, an authorized visit may be enabled by a 911 dispatcher or other authorized user to allow special or temporary access by the smart phone of a normally unauthorized user, for example. The wireless access system 10 may keep a log/audit trail. Approval may be granted by trusted a friend or special authority, for example, emergency medical services, a fire department, or a police department.

The wireless access system 10 may also include a security feature whereby when a threshold time has elapsed, the wireless access system may ignore a remote access device 15 in range. This advantageously reduces or may prevent unauthorized access that may occur from leaving a remote access device 15 that is authorized inside near the door. A timeout function (via a timer, not shown) may additionally be used in other undesired entry scenarios. The wireless access system 10 may also log all rejected pairing attempts, as will be appreciated by those skilled in the art.

The wireless access system 10 may also include a revocable key security feature. For example, the wireless access system 10 may include both revocable and non-revocable keys. If, for example, the wireless access system 10 is unable to access the server 34 to verify keys, for example, the wireless access system may force the application 17 on the remote access device 15, for example, to check the servers. If the wireless access system 10 is unable to connect or verify the keys, access is denied.

For example, the revocable key feature may be particularly advantageous to keep an old boyfriend, for example, who is aware that his key is being revoked from being able to turn off his remote access device 15 so that the key is not deleted. However, a wireless connection for the remote access device 15 may be a prerequisite to access in some instances.

As will be appreciated by those skilled in the art, the wireless access system 10 has the ability to transfer a key from one remote access device 15 to another with the remote access application 17, for example. It may be desired that these keys be revocable in some configurations. However, if the remote access device 15 with the key to be revoked is not accessible via the network 27, then revocation may not be guaranteed if the lock 11 is offline, for example. The wireless access system 10 advantageously addresses these challenges.

A proximity detection feature may be included in the wireless access system 10, and more particularly, the remote access device 15 may use a magnetic field sensor 39, such as, for example, a compass in mobile wireless communications device, as a proximity sensor to obtain a more uniform approach/departure distance calibration. A magnetic pulse or pulse sequence may be used in the lock 11 to illuminate a magnetic flux sensor in the remote access device 15 to establish proximity.

Additionally, the remote device 15, for example, a mobile wireless communications device or mobile telephone, may be qualified using both radio frequency (RF) and audio, for example. The remote access device 15 may be a source or sink of audio to help qualify proximity.

In another embodiment, as an alternative to a human driven lock, as noted above, a turn-tab (not shown) may be included that will "flip out" of the front of the lock 11 when pressed to allow the user to turn the lock on an un-powered deadbolt 14. It may be desirable that the surface area be no larger than a standard key, for example. The user pushes the turn-tab back into the lock face when done. The turn-tab may alternatively be spring loaded, for example.

In another embodiment, the turn-tab (not shown) may be added to a powered lock, for example the lock 11 described above. This is may be useful to help force 'sticky' locks, for example, as will be appreciated by those skilled in the art. This may also allow the user to give a manual assist to the motor in case of a strike/deadbolt 14 misalignment. This may also allow for operation in a low battery situation, for example. The turn-tab may be particularly useful in other situations.

Additionally, one of the deadbolts may have a traditional key backup as it may be needed for emergencies, for example, while the remaining deadbolts on a house may be keyless. This may eliminate the need to match physical keys on multiple deadbolts, and may reduce the cost for additional deadbolts.

The wireless access system 10 may also include an additional access feature. For example, with the home-connect plugin 30 connected to the Internet through server 34 and/or personal computer 25, for example, it may be possible to have the lock 11 unlock via a command from the wireless access system. In other words, the lock 11 could be opened for users who don't have a remote access device 15. More particularly, they could call a call center or service that could unlock the lock 11 via the Internet 27, for example, or via other wireless communications protocol. Also, an authorized user could provide this action as well. Additionally, fire/police could gain access by this method if the lock owner opts-in to this service. As will be appreciated by those skilled in the art, alternatively, a command could be sent from the remote access device 15.

The wireless access system 10 may also include an activation indication. For example, the remote access device 15 can signal the operator via an auditory tone, vibration or other indication when the lock is activated. This may help communicate actions to the user to reduce any confusion.

The wireless access system 10 may also include an additional security feature. For example, the wireless access system 10 may use an additional authentication channel, for example, via a WLAN, WiFi, or other communication protocol, either wired or wireless, with the remote access device 15. This may improve authentication and make spoofing considerably more difficult, as will be appreciated by those skilled in the art.

As another security feature of the wireless access system 10, if cell service and data service, for example, if the remote access device 15 is a mobile phone, are turned off, remote access application may consider this a threat related to key revocation and authentication may not be approved. Also, the lock 11 may include a radar device, or a radar device may be coupled adjacent the lock to detect the locations of the entrant by facing outward in its sweep to resolve inside/outside ambiguity, for example. If the radar does not detect an entrant, then by default the holder of the remote access device is inside and the lock is not activated. The radar may be enabled when the lock 11 is woken up by the home-connect plugin 30 to conserve power.

The lock 11 includes an interior facing directional antenna 50 and a an external facing directional antenna 52. Each is operatively coupled to wireless communication circuitry 22 to send signals to, and list for signals from, remote access device 15. If remote access device 15 is interior of the lock, then interior facing directional antenna 50 communicates with remote access device 15, and the signal strength sensed by directional antenna 50 will be greater than the signal strength sensed by directional antenna 52 (which may be no sensed signal). Lock 11, and in turn system 10, determine that remote access device is inside the home, dwelling or structure. Conversely, if remote access device 15 is exterior of the lock, exterior facing directional antenna 52 communicates with remote access device 15 and the signal strength at directional antenna 52 is greater than the signal strength received at directional antenna 50. System 10 determines that remote access device 52 is outside of the dwelling and operates as discussed above. Home-connect plugin 30 compares the signals from interior facing directional antenna 50 and exterior facing directional antenna 52 to confirm the location of remote access device 12 prior to enabling remote access device 15 to control lock 11. This prevents the door from unlocking each time someone within the structure passes by the lock.

A mechanical or zero/low-power tilt sensor may be configured to detect break-in events, for example to the lock 11. eased upon a detected break-in, the lock 11 activate and thereafter communicate to home-connect plugin 30 to report an intruder alert. The lock 11 may also store information, in a memory, for example, if home-connect plugin is off-line.

Radar or other motion detector device (not shown) may also be added to the home-connect plugin 30 to assist with inside/outside determination and break-in monitoring. The radar or other motion detector may be used in conjunction with an alarm system, as will be appreciated by those skilled in the art.

Indeed, while the different components of the wireless access system 10 have been described with respect to a wireless protocol, it will be appreciated by those skilled in the art that the components may communicate via a wired network and protocols or a combination of wired and wireless networks. Additionally, while Bluetooth and WLAN (i.e. WiFi) has been described herein as wireless protocols of particular merit, other wireless protocols may be used, for example, Zywave, ZigBee, near field communication (NFC), and other wireless protocols.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the invention.

What is claimed is:

1. A wireless access control system for a door, the wireless access control system comprising:

a lock assembly carried by the door and comprising
  a lock,
  lock wireless communications circuitry, and
  a lock controller coupled to said lock and said lock wireless communications circuitry, and configured to switch the lock between a locked position and an unlocked position;
a plugin device remote from said lock; and
a remote access device remote from said lock and configured to wirelessly communicate with said lock controller for switching said lock between the locked and unlocked positions;
said plugin device configured to
  determine a first distance between said remote access device and said lock based upon wireless communication therewith,
  determine when said remote access device is within a second distance from said lock, the second distance being closer to said lock than the first distance, and wirelessly send a lock communication enable command to enable switching of said lock between the locked and unlocked positions by said remote access device based upon said remote access device being within the second distance from said lock.

2. The system of claim 1, wherein said plugin device is configured to determine at least one of the first and second distances based upon a received signal strength from said remote access device by said plugin device.

3. The system of claim 1, wherein said lock controller is configured to cooperate with said lock wireless communications circuitry to wirelessly communicate with said remote access device; wherein said remote access device is configured to wirelessly communicate a response to said lock controller; and wherein said lock controller is configured to determine a position of said remote access device based upon a received signal strength from said remote access device and to enable switching of said lock based upon the determined position.

4. The system of claim 1, wherein said plugin device and said remote access device are configured to communicate using Bluetooth; and wherein said plugin device is configured to wirelessly send the lock communication enable command based upon the Bluetooth communication.

5. The system of claim 1, wherein the remote access device comprises a token.

6. The system of claim 1, wherein the remote access device comprises:

a portable housing;

wireless communications circuitry carried by said portable housing;

memory carried by said portable housing for storing at least one application; and a controller carried by said portable housing and coupled to said memory and said wireless communications circuitry, said controller configured to wirelessly communicate with said lock controller based upon the at least one application.

7. The system of claim 1, further comprising an access control server remote from said plugin device and configured to communicate access credentials thereto.

8. The system of claim 1, wherein said lock controller is switchable between a hibernation state and an awake state; and wherein said plugin device is configured to wirelessly send an awake command to switch said lock controller from the hibernation state to the awake state based upon said remote access device being within the second distance from the lock.

9. The system of claim 1, wherein said lock assembly further comprises an exterior directional antenna facing a exterior direction, and an interior directional antenna facing an interior direction, said lock controller configured to enable switching of said lock based upon a received signal strength at said interior directional antenna being less than a received signal strength at the exterior directional antenna.

10. The system of claim 1, wherein the remote access device comprises a remote access device controller and a geographical position receiver coupled to said remote access device controller; and wherein said remote access device controller is configured to cooperate with said geographical position receiver to determine a geographical position of said remote access device and disable communications when said remote access device is outside a threshold distance from at least one of said lock assembly and said plugin device.

11. The system of claim 1, wherein said lock assembly further comprises a motor coupled to said lock controller; and wherein said lock controller is configured to selectively operate said motor for switching between the locked and unlocked positions based upon communication with said remote access device and said remote access device being less than or equal to the second distance from said lock assembly.

12. The system of claim 1, wherein said plugin device is configured to compare a received signal strength of a plurality of signals communicated from said remote access device, determine, based upon the comparison, a range of in-range received signal strength values, and change the first distance based upon the range of in-range received signal strength values.

13. The system of claim 1, wherein said remote access device has an authorized token associated therewith; and wherein said lock controller is configured to enable switch of said lock based upon at least one of said lock controller and said plugin device recognizing the authorized token.

14. The system of claim 13, further comprising a second remote access device; and wherein said remote access device is configured to communicate with said second remote access device to transfer the authorized token to said second remote access device.

15. The system of claim 13, further comprising a second remote access device; and wherein said remote access device is configured to communicate with said second remote access device to share the authorized token to said second remote access device.

16. The system of claim 13, wherein said remote access device comprises a cellular phone, and wherein the authorized token comprises an application stored on the cellular phone.

17. The system of claim 13, wherein said remote access device is configured to communicate with said second remote access device across a cellular network.

18. The system of claim 1, wherein said lock assembly further comprises a touch sensor coupled to said lock controller; and wherein said lock controller is configured to switch said lock between the locked and unlocked positions based upon touching of said touch sensor by a person associated with said remote access device when said remote access device is at a distance less than or equal to the second distance from said lock.

19. A plugin device for a wireless access control system for a door, the wireless access control system comprising a lock assembly carried by the door and remote from the plugin device and comprising a lock, lock wireless communications circuitry, and a lock controller coupled to the lock and the lock wireless communications circuitry, and configured to switch the lock between a locked position and an unlocked position, and a remote access device remote from the lock and configured to wirelessly communicate with the lock controller for switching the lock between the locked and unlocked positions, the plugin device comprising plugin device wireless communications circuitry; and a plugin device controller coupled to the plugin device wireless communications circuitry and configured to determine a first distance between the remote access device and the lock based upon wireless communication therewith, determine when the remote access device is within a second distance from the lock, the second distance being closer to the lock than the first distance, and wirelessly send a lock communication enable command to enable switching of the lock between the locked and unlocked positions by the remote access device based upon the remote access device being within the second distance from the lock.

20. The plugin device of claim 19, wherein said plugin device controller is configured to determine at least one of the first and second distances based upon a received signal strength from said remote access device.

21. The plugin device of claim 19, wherein the lock controller is switchable between a hibernation state and an awake state; and wherein said plugin device controller is configured to wirelessly send an awake command to switch the lock controller from the hibernation state to the awake state based upon the remote access device being within the second distance from the lock.

22. The plugin device of claim 19 wherein said plugin device wireless communications circuitry and the remote access device are configured to communicate using Bluetooth; and wherein said plugin device controller is configured to cooperate with said plugin device wireless communications circuitry to wirelessly send the lock communication enable command based upon the Bluetooth communication.

23. The plugin device of claim 19 wherein said plugin device controller is configured to compare a received signal strength of a plurality of signals communicated from the remote access device, determine, based upon the comparison, a range of in-range received signal strength values, and change the first distance based upon the range of in-range received signal strength values.

24. A method of wireless access control for a door, the method comprising:

determining, using a plugin device, a first distance between a remote access device and a lock based upon wireless communication with the plugin device, the plugin device being remote from the lock;

determining, using the plugin device, when the remote access device is within a second distance from the lock, the second distance being closer to the lock than the first distance; and wirelessly sending, using the plugin device, a lock communication enable command to enable switching of the lock between the locked and unlocked positions by the remote access device based upon the remote access device being within the second distance from the lock.

25. The method of claim 24 wherein at least one of the first and second distances is determined based upon a received signal strength from the remote access device by the plugin device.

26. The method of claim 24 further comprising determining whether the remote access device is authorized to operate the lock based upon a unique identifier associated with remote access device.

27. The method of claim 24 wherein the remote access device comprises a controller and a memory cooperating therewith, the memory storing at least one application and the processor wirelessly communicating with the lock controller based upon the at least one application.

28. The method of claim 24 further comprising using the remote access device to determine a geographical position of the remote access device based upon a geographical position receiver of the remote access, and disable communications when the remote access device is outside a threshold distance from at least one of the lock and the plugin device.

29. The method of claim 24 wherein the remote access device has a unique identifier associated therewith, and wherein the method further comprises sending, using the remote access device, to a second remote access device for accessing the lock.

* * * * *